Patented Dec. 12, 1939

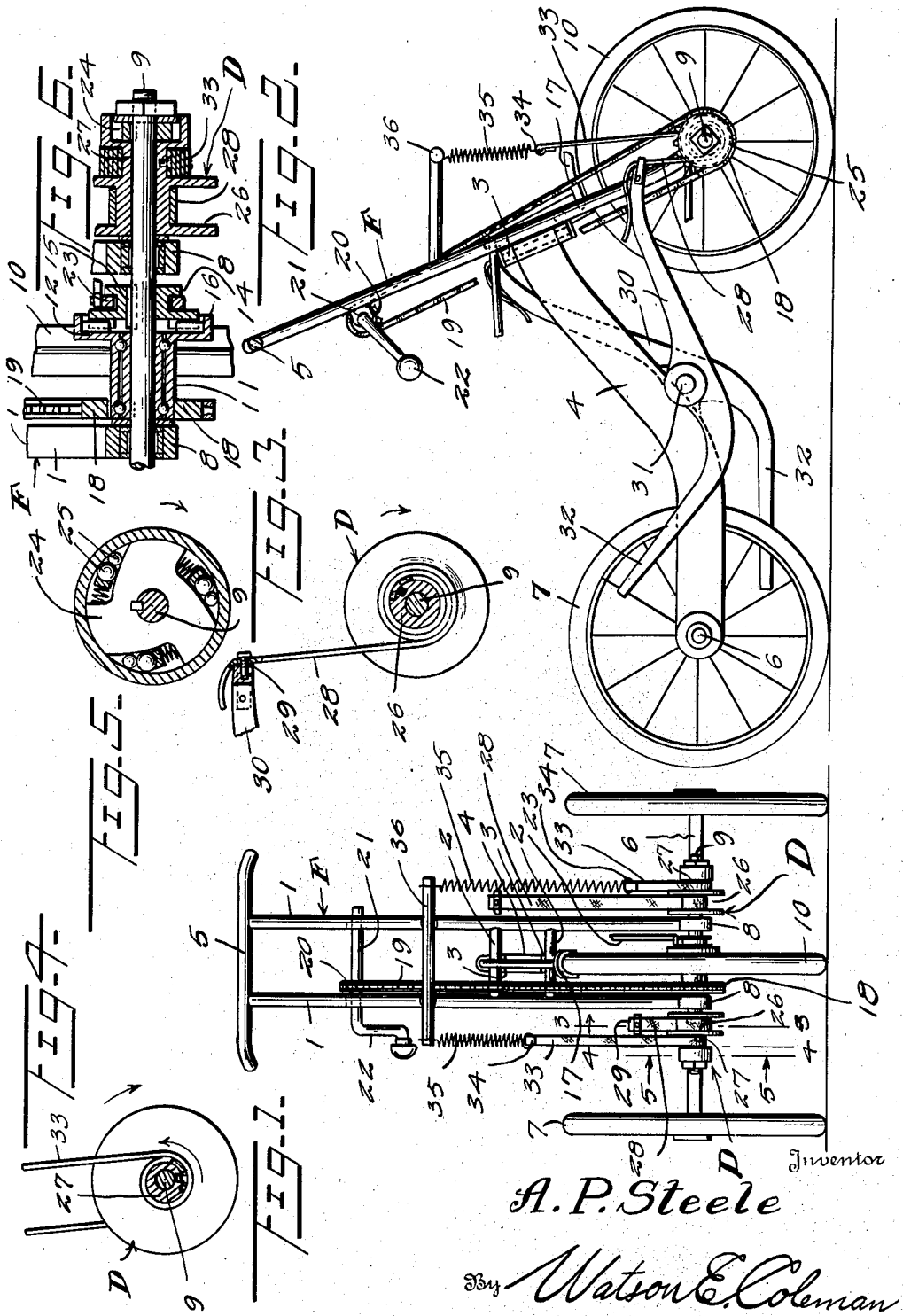

2,183,471

UNITED STATES PATENT OFFICE 2,183,471

VELOCIPEDE

Alexis P. Steele, Statesville, N. C.

Application July 22, 1939, Serial No. 285,984

8 Claims. (Cl. 280—234)

This invention relates to a velocipede, and it is an object of the invention to provide a device of this kind wherein the same may be propelled in a forward direction by a mechanism operated from treadles and assisted, when necessary, by a hand crank or wherein the vehicle may be propelled forwardly or rearwardly by proper operation of the hand crank.

It is also an object of the invention to provide a vehicle of this general type including a steering wheel together with a driving means associated with said steering wheel.

The invention consists in the details of construction and in the combination and arrangement of the several parts of my improved velocipede whereby certain important advantages are attained and the device rendered simpler, less expensive and otherwise more convenient and advantageous for use, as will be hereinafter more fully set forth.

The novel features of my invention will be hereinafter definitely claimed.

In order that my invention may be the better understood, I will now proceed to describe the same with reference to the accompanying drawing, wherein:

Figure 1 is a view in front elevation of a velocipede constructed in accordance with an embodiment of my invention;

Figure 2 is a view in side elevation of the structure as illustrated in Figure 1 with the handle bar in section;

Figure 3 is an enlarged detailed sectional view taken substantially on the line 3—3 of Figure 1;

Figure 4 is an enlarged detailed sectional view taken substantially on the line 4—4 of Figure 1;

Figure 5 is an enlarged detailed sectional view taken substantially on the line 5—5 of Figure 1;

Figure 6 is an enlarged fragmentary sectional view taken in a direction lengthwise of the axle for the front or steering wheel.

As disclosed in the accompanying drawing, F denotes a front fork comprising spaced elongated side bars 1 connected at substantially their longitudinal centers by the interposed cross bars or members 2. These bars 2 are hingedly connected, as at 3, with the forward end portion of a heavy elongated body member or bar 4. This pivotal mounting 3 permits the fork F to be laterally turned from either side of the body member or bar 4 through the medium of the handle bar 5 whereby the direction of travel of the vehicle may be readily controlled. The heavy body member or bar 4 is of desired length and formation and the rear portion of said bar or member 4 carries, in the present embodiment of my invention, the transversely disposed rear axle 6 upon the extremities of which are mounted in the well known way the rear ground engaging wheels 7.

The lower end portions of the bars 1 of the fork F are formed to provide the bearings 8 through which is rotatably supported the front axle 9. Free to rotate with this front axle 9 and positioned between the lower portions of the bars 1 is the front ground engaging steering wheel 10.

The hub 11 of the wheel 10 is provided at one end with a surrounding flange 12 which constitutes a clutch member for coaction with the clutch member 14 keyed, as at 15, for rotation with the shaft 9 but having movement lengthwise thereof. When the clutch elements or members are in engagement one with the other the hub 11 is locked for rotation with the shaft 9. The periphery of the flange 12 is defined by an outwardly disposed flange 16 which serves to provide a drum with which if desired, a brake band may be employed although in Figure 2 of the drawing I illustrate a conventional spoon type of hand brake 17 for coaction with the wheel 10.

The end portion of the wheel hub 11 remote from the flange 12 has fixed thereto a sprocket wheel 18 with which is engaged a sprocket chain 19 which extends upwardly and is operatively engaged with a sprocket wheel 20 rotatably carried by the upper portion of the fork F. As particularly illustrated in Figures 1 and 2, this sprocket wheel 20 is fixed to rotate with a shaft 21 rotatably carried by the bars 1 of the fork F and one end portion of this shaft 21 carries an operating crank 22. Although not shown a second crank may be carried by the opposite end of the shaft 21.

With the clutch member or element 14 in released position, the shaft 21 is adapted to be manually operated to reverse the direction of travel of the vehicle although, if desired, the shaft 21 may be operated to have forward travel.

The member 14 may be moved as desired along the shaft 9 in any manner preferred and as generally indicated at 23. The axle 9 extends a material distance to either side of the wheel 10 and freely mounted on the axle 9 at each side of the wheel 10 is a drum D. This drum D at one end portion houses a ratchet member 24 fixed to rotate with the axle 9 and which ratchet member 24 in a well known manner through the medium of the rollers 25 locks the drum D and the axle 9 for unitary rotation in one direction but permits the drum D to have reversed rotation independently of the axle 9. The drum D is formed to provide two spools 26 and 27. Winding upon the spool 26 is a flexible strap or belt 28, the outer end portion of which is securely attached, as at 29, to the free end portion of a forwardly directed lever 30. This lever 30 is pivotally mounted, as at 31, upon the body member or bar 4 and the pivoted end portion of this lever 30 is continued to provide the upwardly and angularly related foot pedal 32. As the pedal 32 is forced downwardly the strap or belt 28 will be withdrawn from the spool 26 resulting in rotation of the drum D in a direction to interlock with the ratchet 24 so that both the drum D and the axle or shaft 9 will have unitary rotation in the same direction. However, when the pressure on the pedal 32 is released the axle or shaft 9 will continue to rotate independently of the drum D so that retrograde rotation of the drum D may be had to rewind the strap or belt 28 thereon.

Winding upon the second spool 27 is the strap or belt 33, the outer end portion of which is connected, as at 34, to an end portion of a retractile spring 35 of desired tension secured to and depending from an end portion of a cross member 36 securely fastened to the upper portions of the bars 1 of the fork F. As the drum D is rotated under the action of a pedal 32, the strap or belt 33 will wind upon the spool 27 and place the spring 35 under such tension that when the pressure is removed from the pedal 32 the spring 35 will exert sufficient pull upon the strap or belt 33 to wind the drum D in the reversed direction and thus cause the pedal 32 to rise and, of course, the strap or belt 28 to rewind upon the spool 26.

As is believed to be apparent, the vehicle as herein disclosed comprises two operating pedals or treadles and these pedals or treadles are so arranged that they can be operated alternatively, separately operated, or operated in unison. It is to be noted that the levers 30 as well as the associated pedals or treadles 32 travel in directions substantially parallel to the fork F and that there is at all times sufficient spacing between the outer end portions of the levers 30 and the drums to allow unobstructed swinging movement of the drums with the fork during a steering operation. It is, therefore, to be particularly noted that the front wheel 10 serves both as the driver and as the steering medium for the velocipede.

It is also to be noted that the mounting of the front wheel 10 and the driving means therefor is such as to allow said wheel to be turned in either steering direction without in any way interfering with the effective operation of the driving means either by the pedals 32 or as a result of rotation of the shaft 21.

It is to be particularly noted that the front ends of the levers 30 move in paths that approximate the direction of the pivotal mounting 3. This is of advantage as by such arrangement the tendency of the levers 30 in their operation to turn the fork is substantially eliminated but little strain is imposed upon the handle bar 5.

It is to be further stated that the outer or free ends of the levers 30 are limited in their downward strokes to within a few inches of the drums D so as to in no way interfere with or obstruct the drums when the steering fork F is turned as desired to steer the velocipede in its travel.

It is again particularly pointed out that the construction and arrangement of the different parts as herein comprised allow the wheel 10 to operate both as a steering wheel and as a driving wheel.

While in the accompanying drawing the velocipede is illustrated of a tricycle type it is believed to be apparent that the invention can be employed with equal facility with a vehicle of a bicycle type or with any other desired number of ground engaging wheels.

From the foregoing description it is thought to be obvious that a velocipede constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A velocipede including a body member, a steering fork, means for hingedly connecting the fork with the body member for turning movement in either direction laterally of the body member, an axle rotatably supported by the fork, a steering wheel freely mounted on the axle, clutching means for locking the wheel and axle for unitary rotation, drums freely mounted upon the axle at opposite sides of the wheel, coacting means carried by the axle and each of the drums for locking said drum and axle for unitary rotation upon rotation of the drum in one direction, pedals carried by the body member, an operative connection between each of the pedals and one of the drums for rotating said drum and axle in unison upon depression of the pedal, said unitary rotation of the drum and axle rotating the wheel when the first named clutching members are locked, and means for manually rotating the wheel independently of the axle when said first named clutching members are separated.

2. A velocipede including a body member, a steering fork hingedly connected therewith for lateral movement to either side of the body member, an axle rotatably carried by the fork, a steering wheel freely mounted on the axle, coacting clutching members carried by the wheel and axle for locking said wheel and axle for unitary rotation, drums freely mounted on the axle, rock arms pivotally engaged with the body member, operating pedals for said rock arms, a flexible member secured to each of the rock arms and winding upon one of the drums and unwinding therefrom when the pedal is depressed, means for locking the drum for rotation with the axle when the pedal is depressed but allowing the drum to have free rotation in the opposite direction around the axle, a second flexible member winding upon the drum, a retractile member connecting said second flexible member and the fork, said member being placed under tension when the drum rotates upon depression of a pedal to rotate the drum in reversed direction.

3. A velocipede including a body member, a steering fork, means for hingedly connecting the fork with the body member for turning movement in either direction laterally of the body member, an axle rotatably supported by the fork, a steering wheel freely mounted on the axle, clutching means for locking the wheel and axle for unitary rotation, drums freely mounted upon the axle at opposite sides of the wheel, coacting means carried by the axle and each of the drums for locking said drum and axle for unitary rotation upon rotation of the drum in one direction, pedals carried by the body member, an operative connection between each of the pedals and one of the drums for rotating said drum and axle in unison upon depression of the pedal, said unitary rotation of the drum and axle rotating the wheel when the first named clutching members are locked, and means for manually rotating the wheel independently of the axle when said first named clutching members are separated, said means for manually rotating the wheel in one direction being also effective when the clutching members are engaged.

4. A velocipede including a body member, a steering fork, means for hingedly connecting the fork with the body member for turning movement in either direction laterally of the body member, an axle rotatably supported by the fork, a steering wheel freely mounted on the axle, clutching means for locking the wheel and axle for unitary rotation, drums freely mounted upon the axle at opposite sides of the wheel, coacting means carried by the axle and each of the drums for locking said drum and axle for unitary rotation upon rotation of the drum in one direction, pedals carried by the body member, an operative connection between each of the pedals and one of the drums for rotating said drum and axle in unison upon depression of the pedal, said pedals moving in paths of travel substantially parallel to the fork, said unitary rotation of the drum and axle rotating the wheel when the first named clutching members are locked, and means for manually rotating the wheel independently of the axle when said first named clutching members are separated.

5. A velocipede including a body member, a steering fork, means for hingedly connecting the fork with the body member for turning movement in either direction laterally of the body member, an axle rotatably supported by the fork, a steering wheel mounted on the axle, levers pivotally engaged with the body member at opposite sides of the body member, operative connections between the levers and the axle for rotating the axle, said levers having rocking movement in parallel paths, said levers being at opposite sides of the fork and spaced therefrom sufficiently to offer no obstruction to the turning movement of the fork, and pedals for operating the levers.

6. A velocipede including a body member, a steering fork, means for hingedly connecting the fork with the body member for turning movement in either direction laterally of the body member, an axle rotatably supported by the fork, a steering wheel mounted on the axle, levers pivotally engaged with the body member at opposite sides of the body member, operative connections between the levers and the axle for rotating the axle, said levers having rocking movement in parallel paths, said levers being at opposite sides of the fork and spaced therefrom sufficiently to offer no obstruction to the turning movement of the fork, and pedals for operating the levers, each of said pedals being mounted for rocking movement independently of the other.

7. A velocipede including a body member, a steering fork, means for hingedly connecting the fork with the body member for turning movement in either direction laterally of the body member, an axle rotatably supported by the fork, a steering wheel mounted on the axle, levers pivotally engaged with the body member at opposite sides of the body member, operative connections between the levers and the axle for rotating the axle, said levers having rocking movement, the front end portions of said levers being at opposite sides of the fork and limited in their downward movement to a close approximation to the drums but at points spaced from the drums to offer no obstruction to the turning movement of the drums with the fork in a steering operation.

8. A velocipede including a body member, a steering fork, means for hingedly connecting the fork with the body member for turning movement in either direction laterally of the body member, an axle rotatably supported by the fork, a steering wheel mounted on the axle, levers pivotally engaged with the body member at opposite sides of the body member, operative connections between the levers and the axle for rotating the axle, said levers having rocking movement, the forward ends of the levers moving in paths approximating the direction of the hinge connection between the fork and body.

ALEXIS P. STEELE.